United States Patent Office 3,729,565
Patented Apr. 24, 1973

3,729,565
APHICIDAL AND ACARICIDAL COMPOSITIONS CONTAINING N-2,4 DIMETHYLPHENYL-N'-METHYLFORMAMIDINE OR ITS ACID ADDITION SALTS AND METHODS OF USE
Ian Robert Harrison, Bleasby, John Felix McCarthy, Bramcote Hills, and Bryan Harper Palmer, Burton Joyce, England, assignors to Boots Pure Drug Company Limited, Nottingham, England
No Drawing. Filed Dec. 1, 1970, Ser. No. 94,208
Claims priority, application Great Britain, Dec. 12, 1969, 60,793/69; May 14, 1970, 23,500/70
Int. Cl. A01n 9/20
U.S. Cl. 424—326
6 Claims

ABSTRACT OF THE DISCLOSURE

A new N - arylformamidine, namely N-2,4 - dimethylphenyl-N'-methylformamidine, and acid addition salts thereof are described. The compounds possess acaricidal and aphicial properties and pesticidal methods and compositions using them are described. N-2,4-dimethylphenyl-N'-methplformamidine is also of value as an intermediate in the preparation of the pesticidal compound 1,5-di-(2,4-dimethylphenyl)-3-methyl-1,3,5-triazepenta - 1,4-diene described in our copending application Ser. No. 94,209, filed Dec. 1, 1970.

---

N-arylamidine are compounds of known type and many N-arylamidines have been described as possessing pesticidal properties. For example, in British patent specification No. 964,640 there is described a broad group of N-arylamidines in which the aryl group is a phenyl radical optionally containing 1–3 substituents selected from a specified list. These compounds are stated to possess pesticidal properties, including activity against acarids. In British patent specification No. 1,039,930 there is described a group of N-4-chloro-2-methplphenylformamidines and it is stated that the compounds of this group possess activity against mites, including spider mites, but have no effect upon insects. In British patent specification No. 1,140,965 there is described a group of N-4-halo-2-methylphenylformamidines and the compounds of this group are stated to possess activity against the acarid *Boophilus microplus*.

It has been our object to provide pesticidal compounds, methods and compositions of increased effectiveness against spider mite and other acarids.

It has been a further object to provide pesticidal compounds, methods and compositions of increased effectiveness against cattle tick.

It has also been our object to provide pesticidal compounds, methods and compositions that are effective against aphids.

We have found that N-2,4-dimethylphenyl-N'-methylformamidine, a hitherto undisclosed compound which falls within the generic formula of the broad group of N-arylamidines described in the above-mentioned British patent specification No. 964,640, possesses remarkable and unexpected pesticidal properties. In particular we have found surprisingly that the compound possesses an extremely high level of acaricidal activity that is superior to closely related N-arylamidines including compounds specifically disclosed in the hereinbefore mentioned British patent specifications. We have also found that the compound possesses a high level of insecticidal activity against aphids.

In utilizing the pesticidal properties of the formamidine of the present invention, it may be used as the free base or in the form of an acid addition salt thereof. The acid addition salts may also be used as intermediates in the isolation of the formamidine of the present invention. Acid addition salts of N-2,4-dimethylphenyl-N'-methylformamidine may be formed with inorganic or organic acids, for example hydrochloric, hydrobromic, hydriodic, hydrofluoric, sulphuric, nitric, phosphoric, perchloric, sulphamic, formic, acetic, trichloroacetic, oxalic, picric, benzenesulphonic, or p-toluenesulphonic acids.

We have found that N-2,4-dimethylphenyl-N'-methylformamidine possesses a very high level of acaricidal activity against phytophagous spider mites, for example red spider mites such as Tetranychus spp. For example, this formamidine is highly active against *Tetranychus urticae*. The formamidine of the present invention is advantageously active against all stages of development, i.e. eggs, larvae and adults, of Tetranychus spp.

We have also found that N-2,4-dimethylphenyl-N'-methylformamidine possesses a high level of insecticidal activity against aphids, for example *Megoura viciae*, that is surprisingly superior to that possessed by closely related N-arylamidines.

According to a further feature of the present invention there is provided a method for protecting plants from phytophagous spider mites and aphids which comprises treating the locus of the phytophagous spider mites and aphids, i.e. the plants or their habitat, with N-2,4-dimethylphenyl-N'-methylformamidine or an acid addition salt thereof. Such plants include, for example, crops such as fruit trees and vegetables, and ornamental plants, for example chrysanthemums. A suitable rate of application of these compounds is generally within the range 0.05–100 lb./acre, more usually 0.1–10 lb./acre.

We have also found that N-2,4-dimethylphenyl-N'-methylformamidine possesses a very high level of acaricidal activity against the larvae of cattle ticks, for example the larvae of *Boophilus microplus*. This formamidine is also advantageously highly active against gravid females of *Boophilus microplus*, as shown by a suppressive effect on egg laying. The formamidine of the present invention has a high level of activity against both larvae and gravid females of strains of *Boophilus microplus* that are resistant to organophosphorus and carbamate pesticides. This is an important advantage, since *Boophilus microplus* is becoming increasingly resistant to organophorus compounds and carbamates.

According to another feature of the present invention there is provided a method for protecting cattle from cattle ticks which comprises treating the cattle externally with N-2,4-dimethylphenyl-N'-methylformamidine or a non-toxic acid addition salt thereof.

According to a further feature of the present invention there are provided pesticidal, in particular acaricidal and insecticidal, compositions which comprise as an active ingredient N-2,4-dimethylphenyl-N'-methylformamidine or an acid addition salt thereof in association with a diluent or carrier. The diluent or carrier may be a solid or liquid, optionally together with a surface-active agent, for example a dispersing agent, emulsifying agent or wetting agent.

The compositions of the invention include not only compositions in a suitable form for application but also concentrated primary compositions which may be supplied to the user and which require dilution with a suitable quantity of water or other diluent before application. Typical compositions of the invention include, for example, dusting powders, dispersible powders, emulsifiable concentrates, dispersions, aerosols, smokes, emulsions and solutions, e.g. aqueous solutions of a suitable acid addition salt.

A dusting powder comprises the active ingredient intimately mixed with a solid pulverulent diluent, for example kaolin.

A dispersible powder comprises the active ingredient in finely divided form in association with one or more dispersing agents so that a stable aqueous dispersion of the active ingredient is formed on mixing the powder with water. A finely divided inert solid diluent such as kaolin or Celite is generally incorporated in the dispersible powder.

In the dusting powders and dispersible powders, the active ingredient is in the form of fine particles; preferably the majority of the particles, of the order of at least 95%, should be less than $50\mu$, with about 75% of them being $5-20\mu$.

An emulsifiable concentrate, also known as a "miscible liquid," comprises a solution of the active ingredient in a water-immiscible solvent in association with one or more emulsifying agents. An emulsion is formed when the emulsifiable concentrate is mixed with water.

The compositions of the invention may be applied to the ground, for example ground areas around dairies, in order to combat cattle ticks thereon. However in the combating of cattle ticks it is preferred to use the compositions of the invention for the external treatment of cattle. It will be appreciated that for this use the diluent or carrier chosen should be such that the compositions applied to the cattle are substantially non-toxic and non-irritant to the cattle. Similarly, if an acid addition salt of N-2,4-dimethylphenyl-N'-methylformamidine is used, it should be one that is substantially non-toxic and non-irritant to the cattle.

Preferred compositions for use in the external treatment of cattle are cattle dips. By the term "cattle dips" is meant compositions which contain an active ingredient in association with a diluent or carrer, the nature of the diluent or carrier and its proportion being such that, on dilution with an appropriate quantity of water, stable aqueous compositions are produced that are suitable for the treatment of cattle by the conventional procedures of dipping and spraying. The cattle dips of the present invention may take the form, for example, of dispersible powders, emulsifiable concentrates or concentrated aqueous solutions of a suitable acid addition salt e.g. the hydrochloride.

The concentration of N-2,4-dimethylphenyl-N'-methylformamidine or acid addition salt thereof in the hereinbefore mentioned primary compositions of the present invention may vary widely and may be, for example, 5–95% w./w. of the composition, depending on the physical properties of the ingredients.

The concentration of N-2,4-dimethylphenyl-N'-methylformamidine or acid addition salt thereof in the compositions for application to combat the hereinbefore mentioned pests will generally be within the range 0.001–5% w./w., more usually 0.005–1% w./w.

The compositions of the present invention may contain one or more additional pesticides, for example one or more fungicides, additional insectides, or additional acaricides. Such an additional pesticide may be, for example an organophosphorus compound such as azinphos-ethyl, azinphos-methyl, fenitrothion, phosalone, dioxathion, supona, coumaphos, bromophos-ethyl or dursban; a carbamate such as carbaryl, methiocarb or arprocarb; a bridged diphenyl compound such as tedion, tetrasul, chlorbenside or DDT; or a chlorinated hydrocarbon such as benzene hexachloride or toxaphene.

N-2,4 - dimethylphenyl-N'-methylformamidine and acid addition salts thereof may be prepared by methods that are known for the preparation of N-aryl-N'-alkylformamidines and their acid addition salts. Such methods include the following processes.

(a) The reaction of 2,4-dimethylaniline with N-methylformamide. This reaction may be effected in the presence of a suitable condensing agent, for example benzenesulphonyl chloride, p-toluenesulphonyl chloride, thionyl chloride, phosphorus oxychloride or phosphorus pentachloride. A preferred procedure comprises reacting 2,4-dimethylaniline hydrochloride with N-methylformamide in the presence of benzenesulphonyl chloride, p-toluenesulphonyl chloride or thionyl chloride.

(b) The reaction of methylamine with a formimidate of the general formula

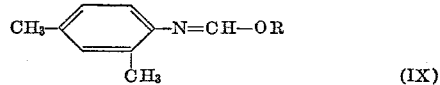

(IX)

in which R is alkyl containing 1–4 carbon atoms.

N-2,4-dimethylphenyl-N'-methylformamidine may also be prepared by reacting methylamine with 2,4-dimethylphenyl isocyanide. The reaction may be effected in the presence of a suitable catalyst, for example cuprous oxide or cuprous chloride. A suitable amount of catalyst is generally 0.01–0.2 molecular proportions, based on the isocyanide. A suitable reaction temperature is 60–100° C. The reaction may be effected in the presence of a suitable inert organic solvent, for example benzene or toluene, or in the absence of such solvent.

The formimidates of the General Formula IX are compounds of known type which may be prepared by known methods, for example by reacting 2,4-dimethylaniline with alkyl orthoformate.

The products of the above reactions may be isolated as the free formamidine or as an acid addition salt thereof.

The acaricidal activities of N-2,4-dimethylphenyl-N'-methylformamidine and related N-arylamidines were determined in a number of tests. The results of these tests, which were carried out as described below, are given in columns A–D of Table 2.

(a) Ovo-larvicidal activity against *Tetranychus urticae* (column A)

French bean leaf discs, 2 cm. in diameter, were cut to retain the petiole which was kept in contact with water throughout the test. Apart from the manipulations involved in the test, the leaf discs were maintained at 65° F. and 75% relative humidity throughout the test. Nine adult female mites of *Tetranychus urticae* were placed on a leaf disc and left for 24 hours, resulting in the deposition of 30–50 eggs on the leaf disc. The exact number of eggs ($x$) was recorded, and the leaf disc was sprayed to the point of run-off with an aqueous solution or dispersion of the compound under test. After 10 days the number of live larvae ($y$) on the leaf disc was counted, and percentage mortality calculated from the expression $$\text{Percent mortality} = 100 - \frac{100y}{x}$$

The test was carried out initially at a concentration of 1000 parts per million (p.p.m.) w./v. of test compound. If a mortality above 50% was obtained at this concentration, further tests were carried out at various concentrations below 1000 p.p.m. w./v. to give results from which an approximate $LD_{50}$ value was calculated. Three replicates were used for each concentration. The resulting $LD_{50}$ values, expressed as p.p.m. w./v. of the test compound in the aqueous spray preparations, are given in column A of Table 2.

(b) Activity against adults of *Tetranychus urticae* (column B)

French bean leaf discs were used, as described in test (a) above. Fifteen adult mites of *Tetranychus urticae* were placed on a leaf disc, which was then sprayed to the point of run-off with an aqueous solution or dispersion of the compound under test. Percentage mortality was recorded after 72 hours. An approximate $LD_{50}$ value was obtained as described in test (a), using an initial concentration of test compound of 1000 p.p.m. w./v. with 3 replicates for each concentration. The resulting $LD_{50}$ values, expressed as p.p.m. w./v. of the test compound in the aqueous spray preparations, are given in column B of Table 2.

(c) Activity against larvae of *Boophilus microplus* (columns C and C')

Test (i).—Glass tubes, 5 cm. x 2.5 cm. open at both ends, were lined with filter papers 4.2 cm. x 4.8 cm. The paper was treated with 0.15 ml. of an acetone solution of the compound under test and allowed to dry. Twenty larvae of *Boophilus microplus* were introduced into each tube, which was sealed with fine mesh gauze. Percentage mortality was recorded after 72 hours, and the assessment was carried out in duplicate.

Test (ii).—Compounds showing high activity in test (i) were examined further. By means of a Tattersfield spraying tower, 1 ml. of an aqueous solution or dispersion of the compound under test was sprayed evenly over 20–30 larvae. After drying, the larvae were transferred to a covered petri dish an dthe mortality recorded after 48 hours. Duplicate assessments were made at concentrations of test compound of 250 p.p.m. w./v. and various concentrations below this value, and approximate $LD_{50}$ values, expressed as p.p.m. w./v. of test compound in the aqueous spray preparations, were calculated from the results. The results of tests (i) and (ii) are expressed as follows.

GRADE 1

In test (i) >50% mortality after contact with deposit from 0.005% w./v. acetone solution $LD_{50} \leqslant 125$ p.p.m. in test (ii).

GRADE 2

In test (i) >50% morality after contact with deposit from 0.005% w./v. acetone solution. $LD_{50} > 125$ p.p.m. in test (ii).

GRADE 3

In test (i), >50% mortality after contact with deposit from 0.05% w./v. acetone solution and <50% mortality after contact with deposit from 0.005% w./v. acetone solution.

GRADE 4

In test (i), <50% mortality after contact with deposit from 0.05% w./v. acetone solution.

Grade 3 compounds are regarded as having very slight activity against *Boophilus microplus* larvae, and Grade 4 compounds are regarded as having no significant activity against such larvae.

The grades 1–4 of the test compounds are given in column C and the $LD_{50}$ values obtained in test (ii) are given in column C' of Table 2. Grade 3 and Grade 4 compounds were not tested in test (ii).

(d) Activity against gravid females of *Boophilus microplus* (column D)

Ten gravid female ticks of *Boophilus microplus* were dipped for 3 minutes in an aqueous solution or dispersion of the test compound. The ticks were drained for 2 minutes, dried on filter paper, and immobilized by placing their dorsal surfaces on sticky tape. The ticks were kept at 77° F. for 6 days, after which the percentage activity was assessed by counting the number of ticks that had not laid a single egg. The test was carried out initially at a concentration of test compound of 500 p.p.m. w./v. If more than 50% of the ticks failed to lay any eggs at this concentration, further tests were carried out at various concentrations below 500 p.p.m. w./v. in order to give results from which an approximate $ED_{50}$ value (dose required to prevent 50% of the ticks from laying any eggs) was calculated. Duplicate assessments were made. The resulting $ED_{50}$ values, expressed as p.p.m. w./v. of test compound in the aqueous dipping preparation, ar given in column D of Table 2. A dash in this column signifies that no test was carried out for a particular compound.

In all the tests (a)–(d) described above, control tests were carried out in which the test organisms involved were treated under identical conidtions with the appropriate aqueous spray or dipping preparation not containing any test compound. In test (c)(i), control larvae were kept in contact with filter paper having no deposit of test compound.

TABLE 2

Acaricidal activities of compounds of the general formula

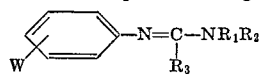

| Compound | | | Activity | | | | |
|---|---|---|---|---|---|---|---|
| W | $R_3$ | $NR_1R_2$ | A | B | C | C' | D |
| 2,4-$(CH_3)_2$ a | H | $NHCH_3$ | 3 | 120 | 1 | 60 | 110 |
| 2,4-$(CH_3)_2$ | H | $NHC_2H_5$ | >1,000 | 420 | 4 | | >500 |
| 2,4-$(CH_3)_2$ | H | $NHC_4H_9$ | >1,000 | >1,000 | 4 | | >500 |
| 4-Cl—2-$CH_3$ b | H | $NHCH_3$ | 58 | 120 | 2 | 250 | >500 |
| 4-Cl—2-$CH_3$ | H | $NHC_2H_5$ | 320 | >1,000 | 4 | | >500 |
| 4-Cl—2-$CH_3$ b | H | $NHC_3H_7$ | 380 | >1,000 | 4 | | >500 |
| 4-Cl—2-$CH_3$ b | H | $NHC_4H_9$ (sec.) | >1,000 | >1,000 | 4 | | >500 |
| 4-Cl—2-$CH_3$ b | H | $NHC_4H_9$ (iso) | >1,000 | 620 | 4 | | >500 |
| 4-Cl—2-$CH_3$ c b | H | $N(CH_3)_2$ | 17 | 230 | 2 | 230 | >500 |
| 4-Cl—2-$CH_3$ b | H | $N(C_2H_5)_2$ | 78 | >1,000 | 4 | | >500 |
| 4-Cl—2-$CH_3$ | $CH_3$ | $NHCH_3$ | >1,000 | >1,000 | 4 | | >500 |
| H d | H | $N(CH_3)_2$ | >1,000 | >1,000 | 4 | | |
| 4-$OCH_3$ d | H | Same as above | >1,000 | >1,000 | 4 | | |
| 4-Cl d | H | do | >1,000 | >1,000 | 4 | | |
| 4-Br d | H | do | >1,000 | >1,000 | 4 | | >500 |
| 3-$CF_3$ d | H | do | >1,000 | >1,000 | 4 | | |
| 3,4-$Cl_2$ d | H | do | >1,000 | >1,000 | 4 | | |
| 3-$CH_3$ d | H | do | >1,000 | >1,000 | 4 | | |
| 3-Cl—4-$CH_3$ d | H | do | >1,000 | >1,000 | 3 | | |
| 3-Cl d | H | do | 500 | 1,000 | 3 | | |
| 3,4-$(CH_3)_2$ d | H | do | >1,000 | >1,000 | 4 | | |
| 4-$C_4H_9$ d | H | do | >1,000 | >1,000 | 4 | | |
| 4-Cl d | $CH_3$ | do | >1,000 | >1,000 | 3 | | |
| 3,4-$Cl_2$ d | $CH_3$ | do | >1,000 | >1,000 | 3 | | |
| 3,4-$Cl_2$ d | H | Piperidino | >1,000 | >1,000 | 4 | | |
| 3,4-$Cl_2$ d | H | Morpholino | >1,000 | >1,000 | 4 | | |
| 4-Cl | H | $NHCH_3$ | >1,000 | >1,000 | 4 | | |
| 4-Br | H | Same as above | *>250 | >1,000 | 4 | | |
| 3-$CF_3$ | H | do | >1,000 | >1,000 | 4 | | |
| 3,4-$Cl_2$ | H | do | *>250 | >1,000 | 4 | | |

See footnotes at end of table.

TABLE 2—Continued

| Compound | | | Activity | | | | |
|---|---|---|---|---|---|---|---|
| W | $R_3$ | $NR_1R_2$ | A | B | C | C' | D |
| 4-$C_4H_9$ | H | $NHCH_3$ | >1,000 | >1,000 | 4 | | |
| H | H | do | >1,000 | >1,000 | 4 | | |
| 4-$NO_2$ | H | do | >1,000 | >1,000 | 4 | | |
| 4-CN—2-$CH_3$ | H | do | >1,000 | >1,000 | 4 | | |
| 4-$NO_2$—2-$CH_3$ | H | do | >1,000 | >1,000 | 4 | | |
| 2,4,6-$Cl_3$ | H | do | >1,000 | >1,000 | 3 | | |
| 2,4,6-$Cl_3$ | H | $N(CH_3)_2$ | >1,000 | >1,000 | 3 | >500 | |
| 2,4,6-$Me_3$ | H | Same as above | >1,000 | >1,000 | 4 | >500 | | a Formamidine of the present invention.
b Specifically disclosed in British patent specification No. 1,039,930.
c Chlorphenamidine, a commercially available acaricide.
d Specifically disclosed in British patent specification No. 964,640.
e Concentrations of test compound above 250 p.p.m. could not be used because of a phytotoxic effect on the leaf disc.

The insecticidal activities against the aphid *Megoura viciae* of N - 2,4-dimethylphenyl-N'-methylformamidine and some related N-arylamidines were determined in the following manner. Broad been plants are grown singly in pots and, when 3–5 cm. tall, they are infested with *Megoura viciae*. Each plant was sprayed to the point of run-off with an aqueous solution or dispersion of the test compound, and kept for 72 hours at 65° F. and 75% relative humidity. Percentage mortality was then assessed by counting the number of dead and alive aphids. The test was carried out initially at a concentration of 1000 p.p.m. w./v. of test compound. If a mortality above 50% was obtained at this concentration, further tests were carried out at various concentrations below 1000 p.p.m. w./v. to give results from which an approximate $LD_{50}$ value was calculated. Three replicates were used for each concentration. The resulting $LD_{50}$ values, expressed as p.p.m. w./v. of the test compounds in the aqueous spray preparations, are given in the following Table 3. Control tests were carried out under identical conditions in which broad bean plants infested with *Megoura viciae* were treated with aqueous sprays containing no test compound.

Insecticidal activity against *Megoura viciae*

TABLE 3

Insecticidal activity against *Megoura viciae*

Compound $$\underset{W}{\diagdown}\!\!\!\diagup\!\!\!-N=CH-NR_1R_2$$

| W | $NR_1R_2$ | $LD_{50}$ |
|---|---|---|
| 2,4-$(CH_3)_2$ a | $NHCH_3$ | 43 |
| 4-Cl—2-$CH_3$ | $N(CH_3)_2$ | >1,000 |
| 4-Cl | $N(CH_3)_2$ | >1,000 |
| 3-$CF_3$ | $N(CH_3)_2$ | >1,000 |
| 3,4-$Cl_2$ | $N(CH_3)_2$ | >1,000 |
| 3-Cl—4-$CH_3$ | $N(CH_3)_2$ | >1,000 |
| 3,4-$(CH_3)_2$ | $N(CH_3)_2$ | >1,000 |
| 4-$C_4H_9$ | $N(CH_3)_2$ | >1,000 | a Formamidine of the present invention.

As can be seen from the foregoing description, the present invention provides a method for combating acarids selected from phytophagous spider mites and cattle ticks, for example *Boophilus microplus*, which comprises contacting the locus of said acarids, i.e. the acarids or their habitat, with an acaricidally effective amount of an acaricide selected from N-2,4-dimethylphenyl-N'-methylformamidine and an acid addition salt thereof.

The following non-limitative examples illustrate the invention.

EXAMPLE 1

A mixture of 55.13 g. 2,4-dimethylaniline hydrochloride, 83.7 g. p-toluenesulphonyl chloride and 150 ml. N-methylformamide was stirred with occasional cooling to maintain the temperature at 20–35° C. When the exothermic reaction had subsided, the mixture was stirred at room temperature for 4 hours, poured into a mixture of ice and water, and basified with 10 N sodium hydroxide solution, maintaining the temperature below 10° C. The precipitated solid was filtered, washed with water until free from alkali, dried at room temperature, and recrystallized from cyclohexane to give N-2,4-dimethylphenyl-N'-methylformamidine, M.P. 75–76° C.

EXAMPLE 2

A solution of 8.1 g. N-2,4-dimethylphenyl-N'-methylformamidine in 30 ml. acetone was added to a solution of 4.5 g. oxalic acid in 25 ml. acetone. An oil separated, which crystallized on scratching. The product was collected by filtration, dried and recrystallized twice from ethanol-diethyl ether (1:2) to give N-2,4-dimethylphenyl-N'-methylformamidinium hydrogen oxalate, M.P. 148–150° C.

In a similar manner, using acetone or diethyl ether as solvent, the following acid addition salts of N-2,4-dimethylphenyl - N' - methylformamidine were prepared:

| Reaction solvent | Salt | M.P., °C. |
|---|---|---|
| Ether | Picrate | 148–150 |
| Acetone | Sulphamate | 118–119 |
| Ether | p-Toluenesulphonate | 137–138 |

EXAMPLE 3

Thionyl chloride (1048 g.) was added to a stirred mixture of 968 g. 2,4-dimethylaniline, 543 g. N-methylformamide and 4 litres toluene under anhydrous conditions, maintaining the temperature of the mixture at 20–30° C. The mixture was then stirred for 1 hour, heated to 65° C., and stirred at this temperature for 16 hours. Air was bubbled through the mixture for 2.5 hours, maintaining the temperature at 60° C., in order to remove hydrogen chloride. The mixture was cooled to 0–5° C., causing the crystallization of N - 2,4 - dimethylphenyl - N' - methylformamidine hydrochloride. A portion of this product was recrystallized twice from isopropyl alcohol to give a pure sample of the hydrochloride, M.P. 166–168° C. A satisfactory elementary analysis was obtained.

EXAMPLE 4

Dry methylamine was passed into a refluxing solution of 5 g. ethyl N-2,4-dimethylphenylformimidate in 50 ml. dry benzene under anhydrous conditions for 8 hours. The resulting solution was evaporated under reduced pressure to remove benzene and ethanol formed in the reaction. The residual oil was diluted with a small volume of cyclohexane and cooled to give a crystalline product. This product was recrystallized from cyclohexane to give N-2,4 - dimethylphenyl - N' - methylformamidine, M.P. 75–76° C. A satisfactory elemental analysis was obtained.

The formimidate starting material used in the above preparation was prepared in the following manner. A mixture of 500 ml. ethyl orthoformate, 242 g. 2,4-dimethylaniline, 0.1 g. 2,4-dimethylaniline hydrochloride and 1000 ml. acetonitrile was introduced into a distillation apparatus. The mixture was heated for 5 hours on a steam bath, allowing ethanol and acetonitrile to distil off. Excess ethyl orthoformate was removed by distillation under reduced pressure and the residue distilled further in a high vacuum to give ethyl N-2,4-dimethylphenylformimidate, B.P. 65° C./0.3 mm.

EXAMPLE 5

Dry methylamine was passed into a stirred mixture of 15.7 g. 2,4-dimethylphenyl isocyanide and 2.86 g. cuprous oxide, under anhydrous conditions. An exothermic reaction occurred, and the rate of addition of methylamine was adjusted to maintain a reaction temperature of 100–110° C. The addition of methylamine was continued until the characteristic odour of isocyanide had disappeared, which took about 20 minutes. The hot reaction mixture was diluted with 16 ml. cyclohexane, filtered with charcoal, and the filtrate cooled to give a crystalline product. This product was recrystallized twice from cyclohexane to give N - 2,4 - dimethylphenyl - N' - methylformamidine, M.P. 75–76° C. A satisfactory elemental analysis was obtained.

EXAMPLE 6

A dispersible powder was prepared by grinding together a mixture of the following ingredients.

| | Percent w./w. |
|---|---|
| N - 2,4 - dimethylphenyl - N' - methylformamidine | 20.0 |
| Sodium N-methyl-N-palmitoyltaurate | 6.0 |
| Sodium di-octylsulphosuccinate | 0.5 |
| Celite | 73.5 |

EXAMPLE 7

An emulsifiable concentrate was prepared from the following ingredients.

| | Percent w./w. |
|---|---|
| N-2,4-dimethylphenyl-N'-methylformamidine | 20.0 |
| Calcium dodecylbenzenesulphonate | 2.5 |
| Nonylphenoxypolyethoxyethanol* | 4.0 |
| Cyclohexanone, anhydrous | 10.0 |
| Xylene, anhydrous | to 100.0 |

* A nonylphenol-ethylene oxide condensate containing an average of 14 mols. ethylene oxide per mol. nonylphenol.

EXAMPLE 8

A dusting powder was prepared from the following ingredients.

| | Percent w./w. |
|---|---|
| N-2,4-dimethylphenyl-N'-methylformamidine | 1.0 |
| Celite | 20.0 |
| Talc | 79.0 |

EXAMPLE 9

N - 2,4 - dimethylphenyl - N' - methylformamidine hydrochloride was mixed with 0.05% w./w. of sodium di-octylsulphosuccinate to form a solid composition suitable for dissolution in water.

We claim:
1. An acaricidal and aphicidal composition which comprises an acaricidally or aphicidally effective amount of an active ingredient selected from the group consisting of N - 2,4 - dimethylphenyl - N' - methylformamidine and an acid addition salt thereof, together with an inert pesticidal carrier.

2. A composition according to claim 1 in which the active ingredient is N-2,4-dimethylphenyl-N'-methylformamidine.

3. A composition according to claim 1 in which the active ingredient is N-2,4-dimethylphenyl-N'-methylformamidine hydrochloride.

4. A method for combating acarids and aphids which comprises applying to said acarids or aphids an acaricidally or aphicidally effective amount of a compound selected from the group consisting of N-2,4-dimethylphenyl-N'-methylformamidine and an acid addition salt thereof.

5. A method according to claim 4 wherein the acarids are phytophagous spider mites.

6. A method according to claim 5 in which said compound is N-2,4-dimethylphenyl-N'-methylformamidine hydrochloride.

References Cited

UNITED STATES PATENTS 3,462,537   8/1969   Merk _____ 424—326

FOREIGN PATENTS 964,640   7/1964   Great Britain.
1,039,930   8/1966   Great Britain.
1,140,965   1/1964   Great Britain.

JEROME D. GOLDBERG, Primary Examiner

L. SCHENKMAN, Assistant Examiner